United States Patent
Witte et al.

(10) Patent No.: US 9,541,413 B2
(45) Date of Patent: Jan. 10, 2017

(54) METHOD AND APPARATUS FOR ESTIMATING JOURNEY ATTRIBUTES

(75) Inventors: Nikolaus Witte, Berlin (DE); George de Boer, Voorburg (NL); Tom Westendorp, Amsterdam (NL)

(73) Assignees: TomTom Development Germany GmbH, Leipzig (DE); TomTom International B.V., Amsterdam (NL)

( * ) Notice: Subject to any disclaimer, the term of this patent is extended or adjusted under 35 U.S.C. 154(b) by 0 days.

(21) Appl. No.: 13/534,413

(22) Filed: Jun. 27, 2012

(65) Prior Publication Data
US 2012/0330547 A1 Dec. 27, 2012

(30) Foreign Application Priority Data
Jun. 27, 2011 (GB) .................................. 1110798.4

(51) Int. Cl.
*G01C 21/20* (2006.01)
*G01C 21/34* (2006.01)

(52) U.S. Cl.
CPC ........... *G01C 21/3446* (2013.01); *G01C 21/20* (2013.01); *G01C 21/3492* (2013.01)

(58) Field of Classification Search
CPC . G01C 21/3446; G01C 21/3492; G01C 21/32; G01C 21/3694; G01C 23/00; G01C 21/20; G08G 1/20; G08G 1/096888; G08G 1/0104; H04B 7/1555; A61K 31/7105; F41G 7/224; H04N 1/00244
USPC ........ 701/119, 410, 532, 533, 123, 2; 707/1; 340/905, 922, 992; 455/3.04, 411.1, 446, 455/414.1; 219/121.62
See application file for complete search history.

(56) References Cited

U.S. PATENT DOCUMENTS

| | | | | |
|---|---|---|---|---|
| 5,459,666 A | * | 10/1995 | Casper | G01C 23/00 340/973 |
| 6,426,709 B1 | * | 7/2002 | Becker | G08G 1/0104 340/988 |
| 8,014,937 B2 | * | 9/2011 | Smyth et al. | 701/119 |
| 2004/0030670 A1 | * | 2/2004 | Barton | G01C 21/32 |
| 2004/0249568 A1 | * | 12/2004 | Endo | G01C 21/3492 701/410 |
| 2005/0093720 A1 | | 5/2005 | Yamane et al. | |
| 2006/0200303 A1 | * | 9/2006 | Fuentes et al. | 701/200 |
| 2007/0010941 A1 | * | 1/2007 | Marsh | 701/209 |
| 2007/0013551 A1 | * | 1/2007 | Gueziec | G01C 21/3492 340/905 |

(Continued)

FOREIGN PATENT DOCUMENTS

EP 1505370 A1 2/2005
JP 2008241724 A 10/2008

(Continued)

OTHER PUBLICATIONS

Search Report issued Sep. 13, 2011 for GB Patent Application No. 1110798.4.

*Primary Examiner* — Yuri Kan

(57) ABSTRACT

Embodiments of the present invention provide a processing device implemented method of estimating journey attributes, comprising selecting a plurality of mobile device journey data according to on one or more criteria associated with end points of the mobile device journey data; determining virtual journey data based upon the plurality of mobile device journey data; determining one or more attributes of the virtual journey data. In some embodiments, the one or more criteria include a distal and/or temporal separation between the journey data.

15 Claims, 8 Drawing Sheets

(56) References Cited

U.S. PATENT DOCUMENTS

| | | | |
|---|---|---|---|
| 2008/0045138 A1* | 2/2008 | Milic-Frayling | H04N 1/00244 455/3.04 |
| 2010/0203868 A1* | 8/2010 | Sagie | G01C 21/20 455/414.1 |
| 2012/0101658 A1* | 4/2012 | Bradley | F41G 7/224 701/2 |
| 2012/0330547 A1* | 12/2012 | Witte et al. | 701/533 |
| 2013/0140283 A1* | 6/2013 | Bradley | A61K 31/7105 219/121.62 |
| 2014/0243001 A1* | 8/2014 | Gavrilovich | H04B 7/1555 455/446 |

FOREIGN PATENT DOCUMENTS

| | | | |
|---|---|---|---|
| JP | 2008286803 A | 11/2008 | |
| WO | 2009053407 A1 | 4/2009 | |

\* cited by examiner

METHOD AND APPARATUS FOR ESTIMATING JOURNEY ATTRIBUTES

CROSS-REFERENCES TO RELATED APPLICATIONS

The application claims priority to United Kingdom Patent Application No. 1110798.4, filed Jun. 27, 2011; the entire contents of which is incorporated herein by reference.

FIELD OF THE INVENTION

This invention relates to mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the Go Live 1000 model manufactured and supplied by TomTom International B.V., provide a reliable means for enabling users to navigate from one position to another.

It is frequently required or useful to determine an estimate of a journey time between two or more geographical locations. For example, a user may wish to determine an estimate of a journey time between two or more locations in advance of commencing a journey between those locations. Sometimes the user wishes to compare estimated journey times via different routes between the locations. In other situations, an organisation may wish to determine an estimate of journey time for display on a variable message sign or for traffic management purposes. For example, the organisation may wish to validate journey time information displayed on variable message signs by comparing the displayed information with journey information at the time of display.

Historic journey information i.e. a store of previous journey information of one or more travellers may be used to estimate journey time. This is often done by determining an average travel time between locations during a certain period or "window" of time. In such methods, probe data from one or more sources, such as navigation devices or mobile telephones, is used to determine an average speed of travel along road segments during specified periods of time. This average speed information is then used to determine an expected journey speed for a route including those road segments. However, this is only an approximate estimate of the journey time due to the averaging of the probe data during the period of time.

The present invention provides an improved system and method for determining one or more attributes of a journey, such as journey time.

SUMMARY OF THE INVENTION

According to a first aspect of the present invention, there is provided a method of estimating journey attributes, comprising selecting a plurality of mobile device journey data according to one or more criteria associated with end points of the mobile device journey data; determining virtual journey data based upon the plurality of mobile device journey data; determining one or more attributes of the virtual journey data.

In some embodiments, the criteria include a distance between adjacent mobile device journey data, a time between adjacent mobile device journey data, or a distance and time between adjacent mobile device journey data. The plurality of journey data may be selected such that the virtual journey data is formed from the plurality of mobile device journey data, wherein the end points of adjacent mobile device journey data are geographically coterminous or are distally separated. The virtual journey data may be formed, at each location along the route, by a single portion of mobile device journey data.

The distance between adjacent mobile device journey data may be a distance between geographic locations of the end points of adjacent mobile device journey data. The distance may be a distance along one or more road segments forming a route between end points of adjacent mobile device journey data.

The time between adjacent mobile device journey data may be a time between end points of adjacent mobile device journey data.

In some embodiments, the method may comprise comprising extrapolating the selected mobile device journey data. First mobile device journey data may be extrapolated to a geographic location of an end-point of second mobile device journey data. The mobile device journey data may be extrapolated based on a difference between a speed of travel of the mobile device and speed information associated with map data or a free-flow speed of one or more road segments. The time between adjacent mobile device journey data may be a temporal difference between the extrapolated mobile device journey data and the end-point of the adjacent mobile device journey data.

In some embodiments, the method may comprise combining the selected plurality of mobile device journey data to generate the virtual journey data. The combining of the plurality of mobile device journey data may comprise concatenating the mobile device journey data.

In some embodiments, the method may comprise determining a start time of the virtual journey data based on the plurality of mobile device journey data. The start time may be determined based on an error value indicative of a temporal error between the virtual journey data and the mobile device journey data.

In some embodiments, the one or more attributes of the virtual journey may include a journey time between one or more locations.

According to another aspect of the present invention, there is provided a computing device, comprising a processing device arranged to select a plurality of mobile device journey data (810, 820) according to on one or more criteria associated with end points of the mobile device journey data, to determine virtual journey data based upon the plurality of mobile device journey data, and to determine one or more attributes of the virtual journey data; and a store accessible to the processing device comprising the mobile device journey data.

According to another aspect of the present invention, there is provided computer software operable, when executed on a mobile system as described herein above, to cause a processor to implement a method of estimating journey attributes, comprising selecting a plurality of mobile device journey data according to on one or more criteria associated with end points of the mobile device journey data; determining virtual journey data based upon the plurality of mobile device journey data; determining one or more attributes of the virtual journey data. The computer software may be stored on a data storage medium.

As will be appreciated, any of optional and preferred features described with reference to the first aspect of the invention are applicable, individually or in combination, with any of the other aspects of the invention.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute navigation software so as to provide route planning and navigation functionality. It follows therefore that in the context of the present application, a navigation device is intended to include (without limitation) any type of mobile route planning and navigation device, irrespective of whether that device is embodied as a PND, a navigation device built into a vehicle, or a mobile telephone or portable digital assistant (PDA) executing route planning and navigation software.

Figure 1:
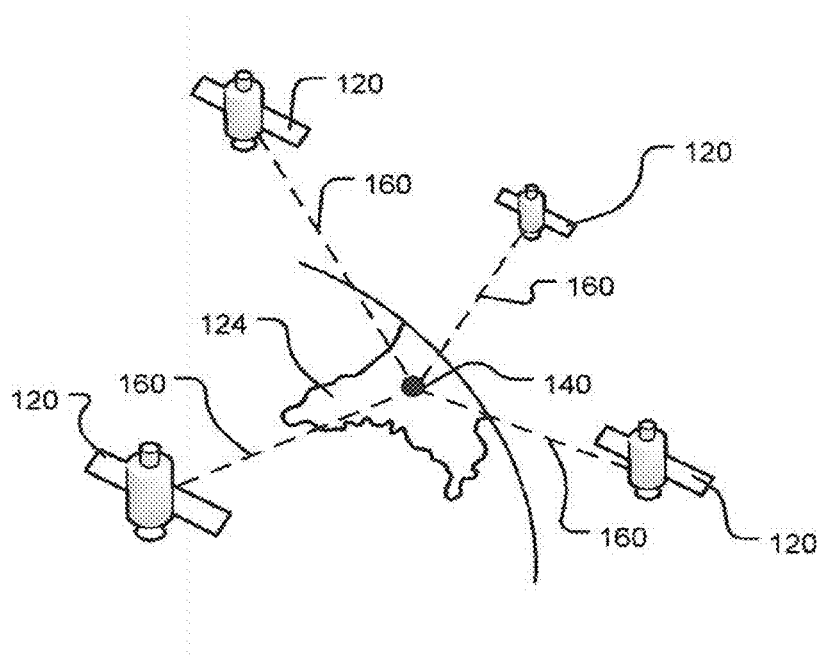
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
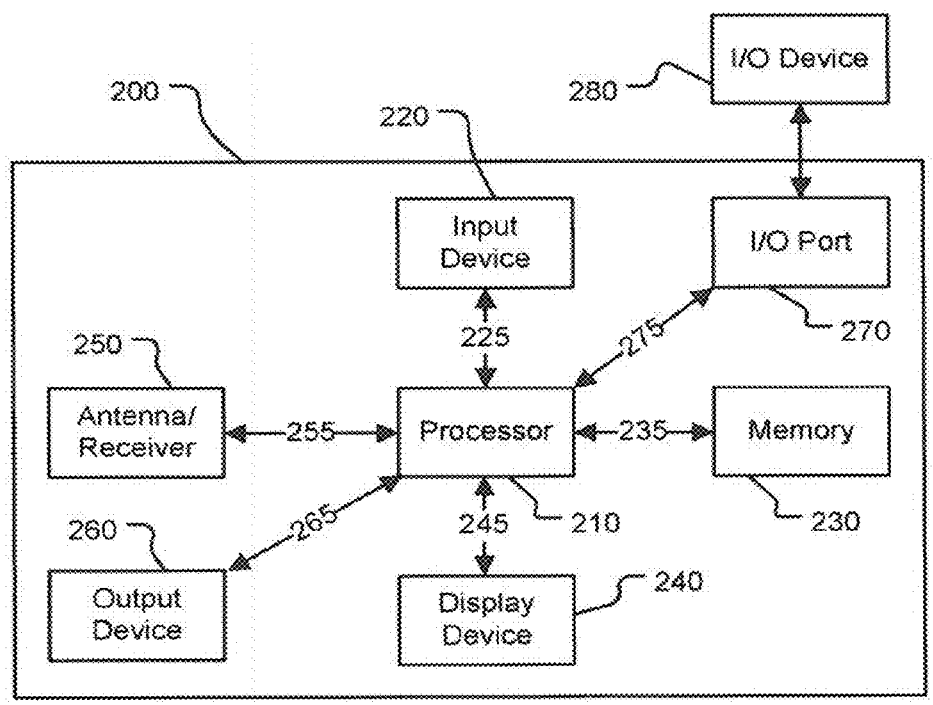
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
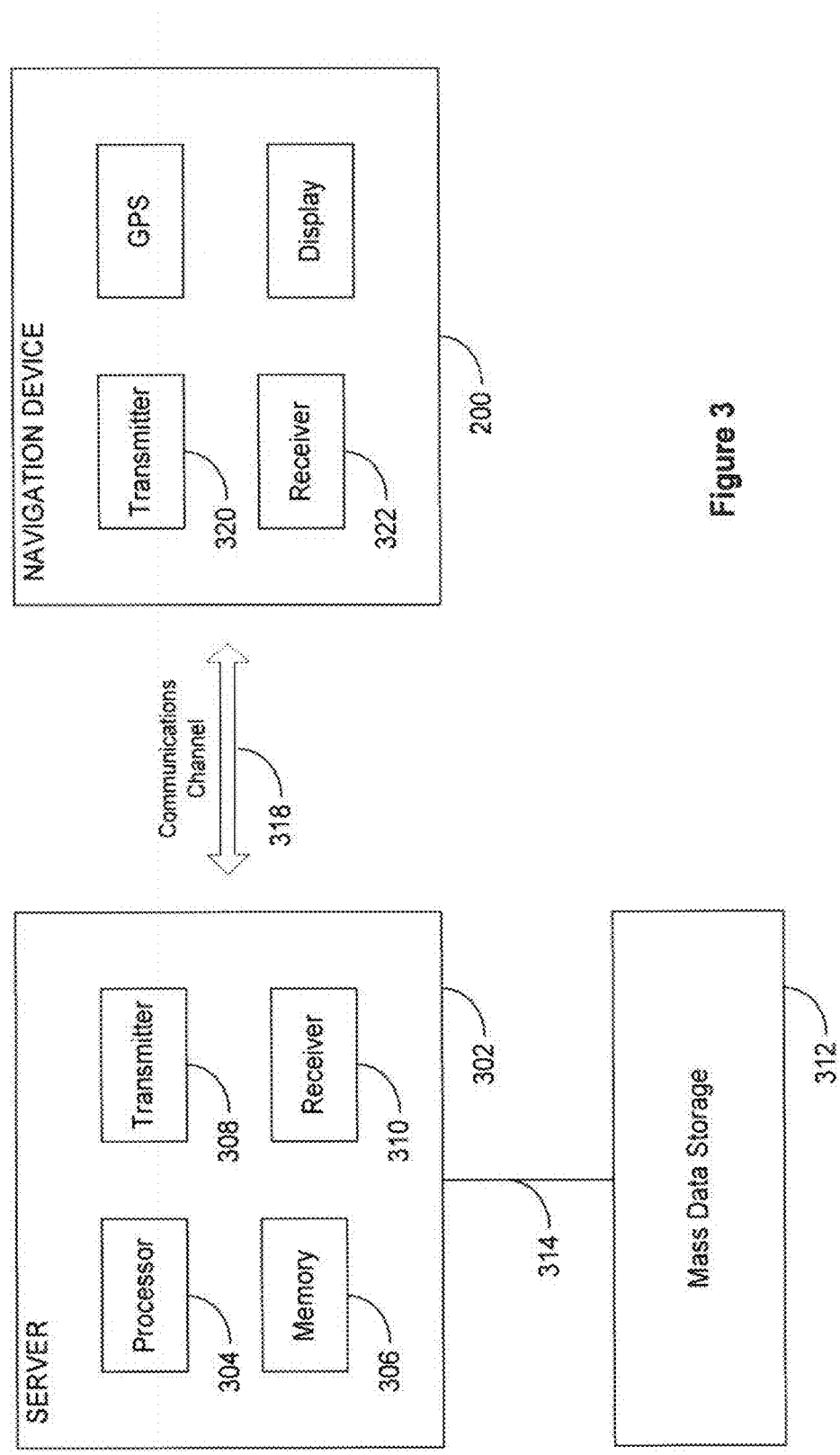
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
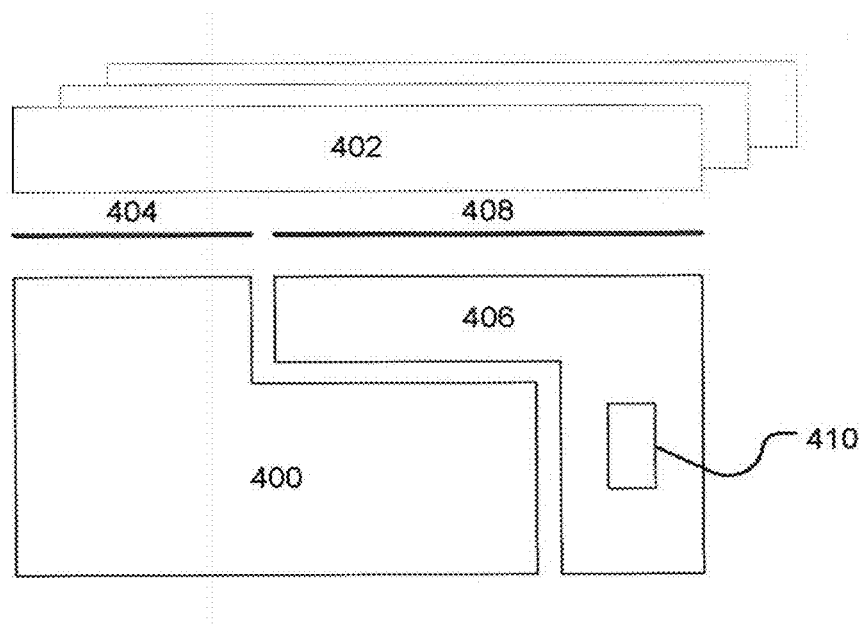
FIG. 4 shows the high level system architecture of a preferred embodiment of the mobile navigation device.

FIG. 4 shows the high level system architecture of components on a mobile navigation device 200 according to a preferred embodiment of the present invention. The navigation device 200 includes an operating system 400, one or more applications 402 and an interface between the operating system and the applications 404. An application support framework 406 is provided for supporting the applications 402 and which has access to the various libraries and drivers of the operating system 400. An interface 408 is provided between the support framework 406 and the applications 402. In the preferred embodiment, a journey time estimation module (JTEM) 410 is provided within the application support framework 406.

Figure 5:
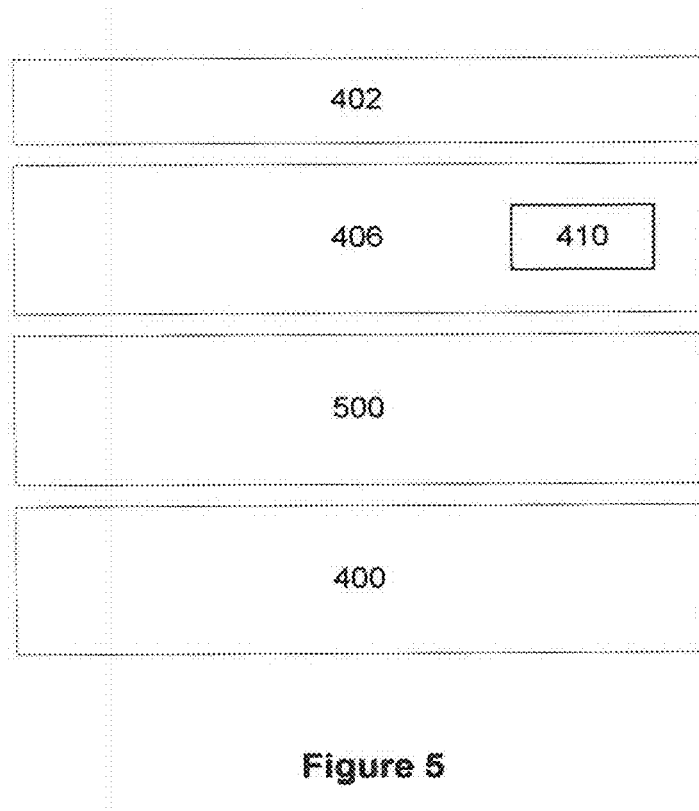
FIG. 5 shows a preferred embodiment of a software stack on a preferred mobile navigation device.

FIG. 5 shows a software stack that may be used in a preferred embodiment of the mobile navigation device 200. The stack comprises an OS kernel 400. This may include display drivers, keypad drivers, camera drivers, power management, audio drivers, etc. The stack also comprises libraries 500, e.g. including graphics libraries, runtime libraries etc. The stack also comprises an application framework 406, which includes the JTEM 410 and may also include, for example, a window manager, resource manager notification manager, a telephony manager, etc. The stack also comprises the one or more applications 402.

Whilst the JTEM 410 is shown implemented in a system architecture of a mobile navigation device 200, it will be appreciated that this is merely exemplary. Embodiments of the JTEM 410 may be implemented in any computing device, including desktop, portable (laptop, tablet etc.) or server computers. In other words, the JTEM 410 is not limited to being implemented in a mobile navigation device 200.

The JTEM 410 is communicably coupled to a store, such as a database, which holds journey data obtained from one or more mobile devices. The mobile devices need not be mobile navigation devices and may be other types of device capable of determining their geographic location and storing journey data based thereon, such as mobile communication devices or vehicle tracking devices. The journey data may also be known as probe data. The journey information is indicative of journeys made by the mobile device(s). Each journey made by each mobile device may be stored as journey data indicative of the location of the mobile device at a plurality of times. In some embodiments, the journey data contains discrete indications of a geographic location of the mobile device at periodic time intervals. In other embodiments the journey data may be stored as a representation of the route taken by the mobile device, for example a fitted approximation of the route, and temporal information associated with the route indicating a time of the mobile device following the route. Based on the journey data, a route followed and a speed of travel of a user in possession of the mobile device may be determined. The route taken may be determined by associating geographic locations of data points and road segments in map data and the speed of travel may be determined between data points forming the journey data. It will be realised that other storage formats of the journey data may be envisaged.

Figure 6:
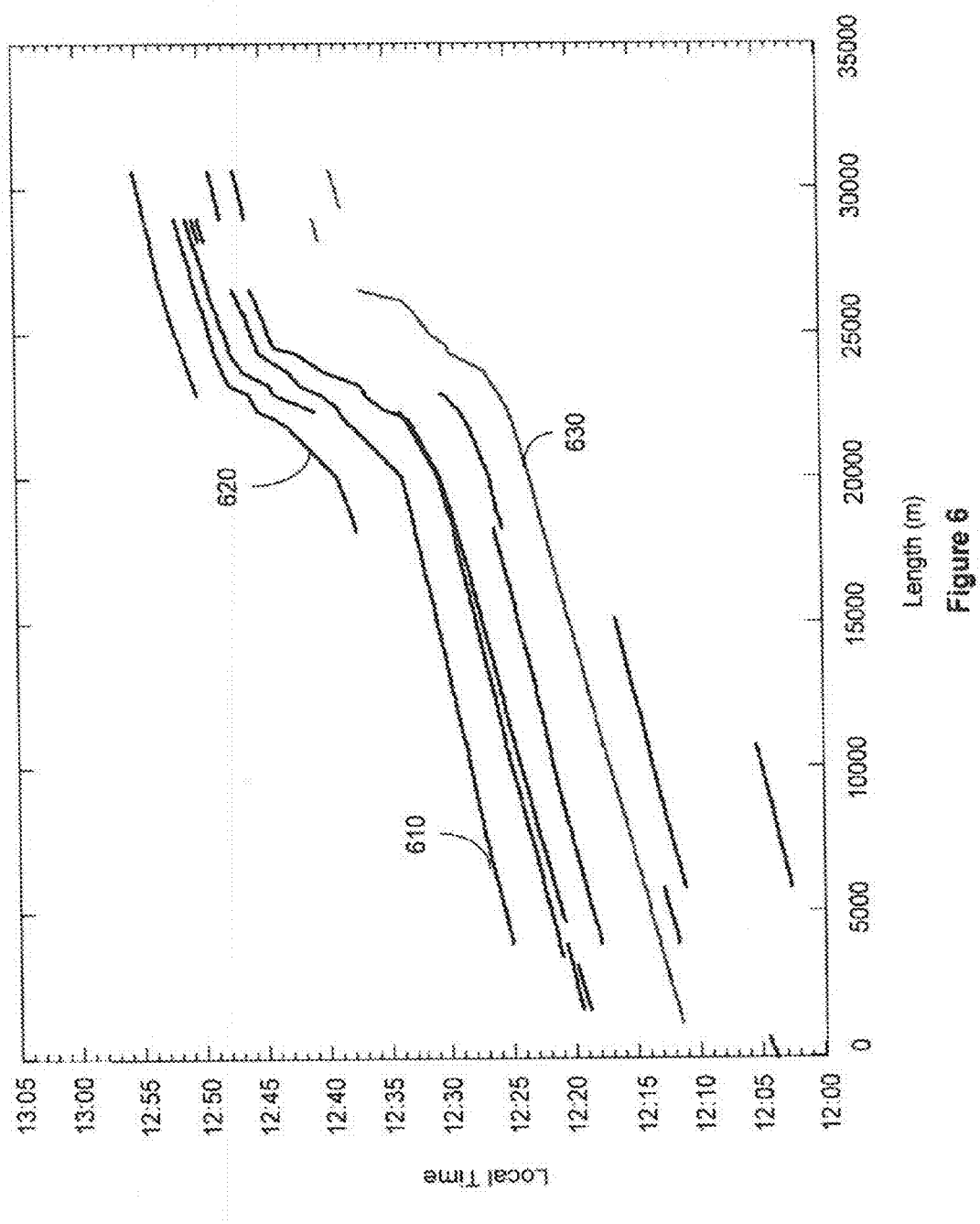
FIG. 6 illustrates a plurality of items of journey data along a route.

FIG. 6 illustrates journey data from a plurality of mobile devices for a particular route. The journey data is displayed as a plurality of journey traces 610, 620, 630, wherein each journey trace 610, 620, 630 indicates a position of the mobile device along the route, i.e. a distance of the mobile device along the route, plotted against time. It will be understood that a route may include one or more road segments between a start location and a destination location and may also include, or pass through, one or more intermediate locations or waypoints. For example, embodiments of the present invention may be used to determine an estimate of journey time between the start and destination locations via a plurality of road segments selected according to one or more criteria. In this example the x-axis of FIG. 6 indicates a distance along the route between the start and destination locations along the road segments forming the route and the y-axis indicates the corresponding time of travel.

A first journey trace is indicated in FIG. 6 with reference numeral 610, a second journey trace with reference numeral 620 and a third journey trace with reference numeral 630. Not all journey traces have been given reference numerals for clarity. FIG. 6 illustrates difficulties with determining a journey time along the route. For a predetermined route a probability of a single user having travelled along the route between desired start and destination locations is relatively small, even when considering a large database containing a large amount of journey data. For example, it will be noted that no single journey trace in the journey data indicated in FIG. 6 has been made between the start and destination locations. Even if a complete journey trace exists between the start and destination locations, including travel via any desired intermediate locations, the journey may not have been performed at a time of interest. Embodiments of the invention provide methods and apparatus for determining an estimate of journey time along a route by combining or concatenating journey data for a plurality of journeys which may each only form part of the overall journey of interest, as will be explained. Embodiments of the invention provide an estimate of the journey time at a particular, specific, departure time, rather than being a more general estimate of journey time within a time window.

Figure 7:
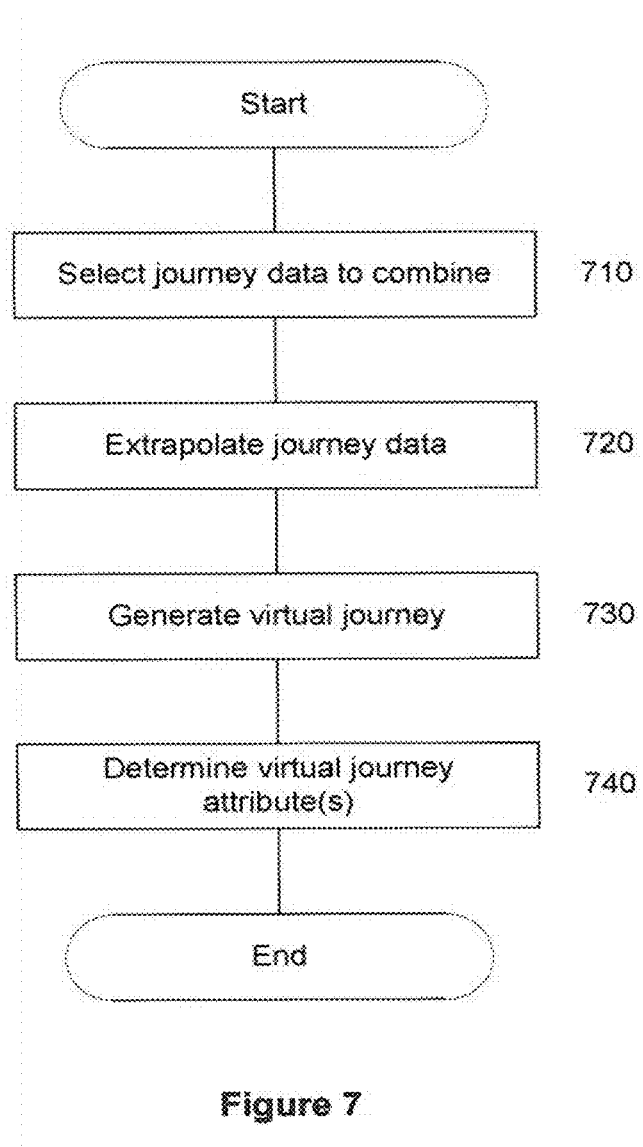
FIG. 7 shows a method according to an embodiment of the invention.

FIG. 7 illustrates a method 700 according to an embodiment of the invention. The method 700 may be performed by an apparatus executing the JTEM 410, such as a mobile navigation device 200 or another computing device wherein a processing device executes the method 700.

The method includes a step 710 in which journey data for a plurality of journeys is selected according to one or more criteria to combine to form a virtual journey between the start and destination locations along the route which is at least partially complete. In this sense, a virtual journey is a journey that has not been made by a mobile device, but which is constructed from journey data indicative of a plurality of journeys which have been made by one or more mobile devices and recorded by the mobile device(s). In step 720 any missing journey portions of the virtual journey are filled by extrapolation to complete the virtual journey. In step 730 the journey data for the virtual journey is generated. In step 740 one or more attributes of the virtual journey are determined. The steps 710-740 of the method will now be explained in further detail.

In step 710 journey data from one or more mobile devices indicative of at least first and second journeys is selected to form the basis of the virtual journey. It will be understood that the plurality of journeys may be derived from a single physical journey, or from a plurality of different journeys. For example, a user of a mobile device may have made a single physical journey between two locations, wherein the user's mobile device has only determined journey information for disparate parts of the route. For example, the mobile device may have been inoperative or unable to determine its location whilst the user travelled one or more intermediate parts of the route. In this sense, the sections for which the mobile device determined journey data are each considered to represent a separate journey, even though deriving from the same physical journey made by the user.

Figure 8:
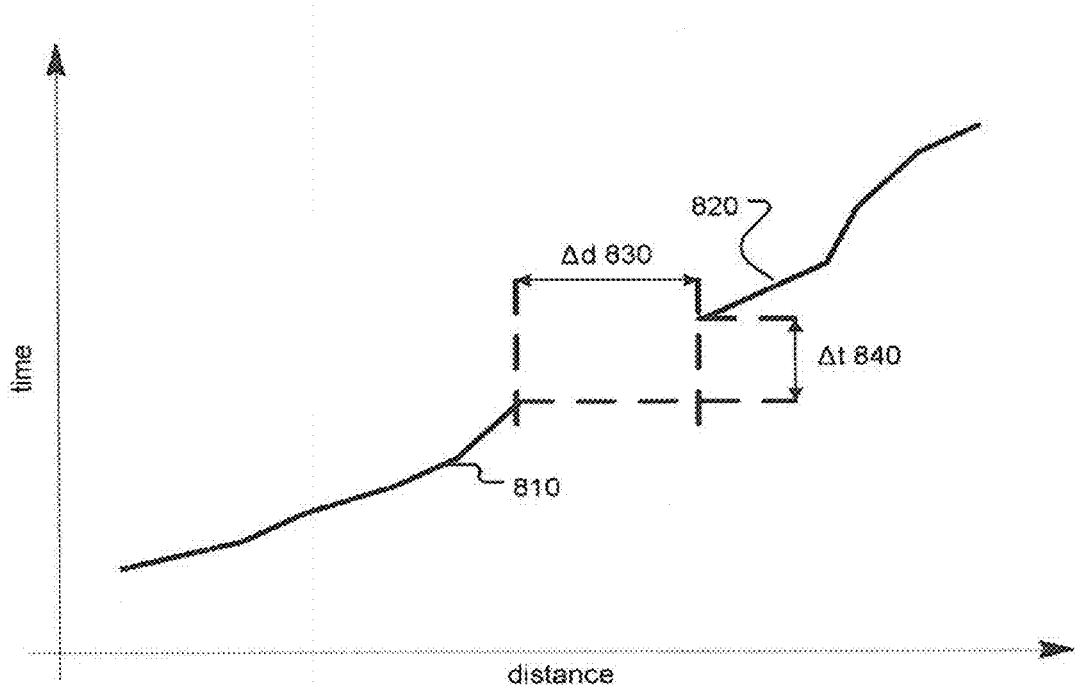
FIG. 8 illustrates selecting journey data according to an embodiment of the invention.

FIG. 8 illustrates first and second example journey traces 810, 820 each derived from journey data along a route. A first journey trace 810 indicates a first journey along part of the route and a second journey trace 820 indicates a second journey along another, subsequent, part of the route. It will be noted that there exists a separation, or gap, of a portion of the route between the first and second journey traces 810, 820. The first and second journey traces 810, 820 are still considered to be adjacent journey traces, even though interposed by the separation. The gap may be a gap in distance Δd 830 i.e. the first journey trace 820 ends at a geographic location along the route before the second journey trace 820 begins, or a gap in time Δt 840 where the first journey trace 810 ends at a first time, but at a substantially similar location i.e. within a predetermined distance, before the second journey trace 820 begins, or a combination of both distance 830 and time 840, as shown in FIG. 8. Embodiments of the invention determine whether the first and second journey traces 810, 820 are suitable to be combined according to one or more criteria in step 710.

A first criteria by which the suitability of combining first and second journey data may be considered is the magnitude of the distance separation 830 between the first and second journey traces 810, 820 i.e. Δd. The first and second journey traces 810, 820 may be determined as suitable to form parts of the virtual journey if Δd 830 is less than or equal to a maximum distance separation value, as in Equation 1:

$$\Delta d <= d_{max} \quad \text{Eqn. 1}$$

where $d_{max}$ is a maximum distance separation value, which may be 2 km, 5 km, 10 km, or another suitable distance.

A second criteria by which the suitability of combining first and second journey data 810, 820 may be considered is the magnitude of a temporal separation 840 between the first and second journey traces 810, 820 i.e. Δt 840. In some embodiments, where the first and second journey traces 810, 820 begin and end at the same location, or within a predetermined distance of each other such as 500 m or 1 km (other distance values may be used), the temporal separation 840 may be considered in relation to a maximum temporal separation value, as in Equation 2:

$$\Delta t <= t_{max} \quad \text{Eqn. 2}$$

where $t_{max}$ is a maximum temporal separation value, which may be 1 minute, 5 minutes, or any other suitable temporal value. The first and second journey traces 810, 820 are determined to be suitable to form parts of the virtual journey if Δt is less than $t_{max}$.

However, where a distance separation 830 also exists between the first and second journey traces 810, 820, i.e. the first journey trace 810 ends at a different location and a different time to the location and time at which the second journey trace 820 begins, the temporal separation 840 between an extrapolated one of the first and second journey traces 810, 820 and the other respective journey trace may be considered, as will be explained.

Figure 9:
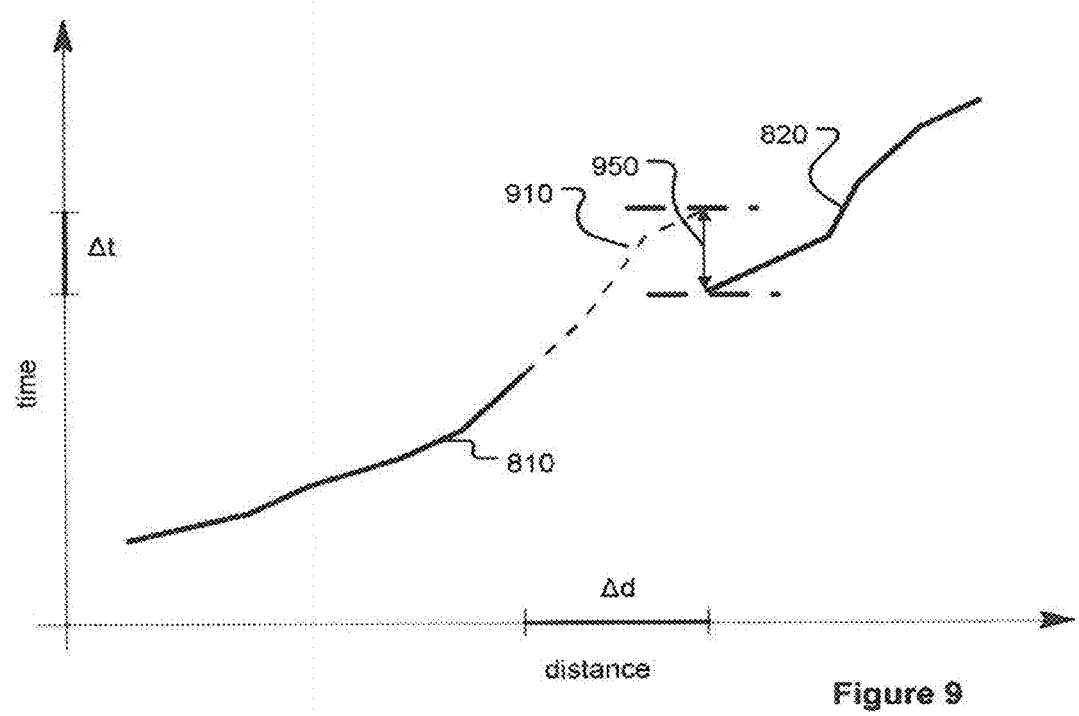
FIG. 9 illustrates extrapolating journey data according to an embodiment of the invention.

The journey data of at least some of the journey traces selected in step 710 is extrapolated in step 720 to form a substantially continuous journey trace between the start and destination locations. It will be understood that substantially continuous means along the distance (x-axis) since, as shown in FIG. 9, a temporal difference 950 may exist between journey traces 810, 820 following extrapolation. The following description assumes that the first journey trace 810 is extrapolated forward along the route toward the second journey trace 820. However, it will be realised that the second journey trace 820 could equally be extrapolated backward along the route.

Firstly, in order to extrapolate the first journey trace 810 along the route, a speed of travel of the user of the respective mobile device along the route between the end of the first journey trace 810 and the start of the second journey trace 820 is determined. The speed of travel may be determined based upon speed information associated with map data for one or more road segments between the first and second journey traces 810, 820. The speed information associated with the map data may be determined on parameters such as road type, speed limit information etc., as is known in the art. Based on the speed information the first journey trace 810 may be extrapolated to the location at which the second journey trace 820 begins to determine a time difference Δt 950 between the first and second journey traces 810, 820 at that location.

In some embodiments, a free-flow speed for the one or more road segments between the first and second journey traces 810, 820 is utilised. The free-flow speed for a road segment may be determined from journey data for that road segment during one or more periods of time when the road segments are expected to be relatively free of traffic. The period of time may be during the night time, such as 02:00-04:00 hours, although other time periods may be used. By averaging the speed of travel of a plurality journeys during these hours a free-flow speed for each road segment may be determined which reflects real-world conditions on that road segment with minimal traffic. For example, the free-flow speed for a road segment may be determined as 56 kmh$^{-1}$.

In some embodiments, an expected travelling speed ratio of the user responsible for the first journey trace 810 may be determined based on the free-flow speed. The expected travelling speed ratio may be determined by comparing the free-flow speed with the speed of travel of the user for one or more road segments, as in Equation 3:

$$\text{Ratio}_{user} = \frac{\text{Speed}_{user}}{\text{Speed}_{flow}} \quad \text{Eqn. 3}$$

where $\text{Ratio}_{user}$ is the expected travelling speed ratio for the user, $\text{Speed}_{user}$ is the average speed of the user along a road segment from the journey data forming the first journey trace 810 and $\text{Speed}_{flow}$ is the free-flow speed for that road segment. The road segment considered to determine the user speed may be the last road segment forming the first journey trace 810. It will also be noted that in some embodiments $\text{Speed}_{flow}$ in Equation 3 may be replaced by $\text{Speed}_{map}$ indicating the speed information from map data for that road segment to determine the ratio of the user's travelling speed to the speed information in the map data. Therefore, if the user travelled the last road segment in the first journey data at 45 $\text{kmh}^{-1}$ and the free-flow speed is 56 $\text{kmh}^{-1}$, the expected travelling speed ratio for the user would be determined as 0.8 from Equation 3.

For each road segment between the first and second journey traces 810, 820 an expected speed of travel of the first user may be determined based on the expected travelling speed ratio and the free-flow speed as in Equation 4:

$$\text{Speed}_{user} = \text{Ratio}_{user} \times \text{Speed}_{flow} \qquad \text{Eqn. 4}$$

As in Equation 3, the $\text{Speed}_{map}$ may also be used in place of the free flow speed to determine the user's expected speed based on the map data. Therefore, if for a road segment interposing the first and second journey traces the free flow speed is determined as 50 $\text{kmh}^{-1}$ and the expected travelling speed ratio for the user is 0.8, as determined by Equation 3, the user's expected speed of travel for that road segment would be 40 $\text{kmh}^{-1}$.

Referring to FIG. 9, the first journey trace 810 is extrapolated 910 to the location at which the second journey trace 820 begins to determine a time difference $\Delta t$ 950 between the first and second journey traces 810, 820 at that location. This extrapolation represents a "filling" of the virtual journey between the first and second journey portions 810, 820 of the virtual journey, as in step 720 of FIG. 7. In other words, at least some of the journey traces selected to form the virtual journey are extrapolated to fill any gaps in the virtual journey, such that a continuous virtual journey is formulated.

By utilising the speed of travel of the user along the road segments interposing the journey traces, as determined in Equation 4, to extrapolate the journey trace a more accurate extrapolation is determined. For example, considering a case where the first and second journey traces 810, 820 are on main roads or highways having a relatively high speed of travel, the portion of the route interposing the first and second journey traces may include one or more road segments off the main road or highway having a relatively low average speed. By utilising the free flow speed or speed information from map data, the journey trace is more accurately extrapolated.

In some embodiments, the first and second journey traces 810, 820 may be considered suitable to form portions of the virtual journey if the time difference $\Delta t$ 950 is less than or equal to a minimum one of: a fixed error value $t_{min}$ plus a time value based on the extrapolated time difference $\Delta t_{ext}$ which may be a percentage of $\Delta t_{ext}$ according to a scaling factor $t_{rel}$ which may be a value between 0.5 and 1.5, although other values may be used, or a maximum time value $t_{max}$ as in Equation 5:

$$\Delta t <= \min(t_{min} + \Delta t_{rel}, t_{max}) \qquad \text{Eqn. 5}$$

Equation 5 may be used in combination with the distance condition specified by Equation 1 where $\Delta d$ 830 is determined between the first and second journey traces 810, 820, rather than considering the extrapolated journey trace 910.

In many cases, a plurality of journey traces may be suitable candidates for form at least a portion of a virtual journey. Therefore it is necessary to further select journey traces to form the virtual journey from amongst the plurality of candidate journey traces. It will be appreciated that the virtual journey is formed from a single journey trace, or an extrapolated portion of a single journey trace, at each location along the route, rather than from attributes of multiple journeys along each road segment. Therefore it may be necessary to select the desired journey trace for each location from amongst a plurality of candidate journey traces. One or more criteria may be used to select from amongst the candidate journey traces, which may be selected from amongst the following criteria:

a) journey traces having the same user ID;
b) minimum concatenation distances $\Delta d$;
c) minimum time difference $\Delta t$; and/or
d) minimum difference between relative speeds i.e. $\text{Ratio}_{user}$.

It may be advantageous to select journey traces having the same user ID to ensure, as much as possible, consistency in the virtual journey. A gap may exist between first and second journey traces 810, 820 made by the same user during the same journey when the user drives through a tunnel, for example, as described above.

In step 730 the journey data for the virtual journey is generated. The virtual journey data may be formed by concatenating the first and second journey traces 810, 820 and any further journey traces selected to form the virtual journey data for the route.

Figure 10:
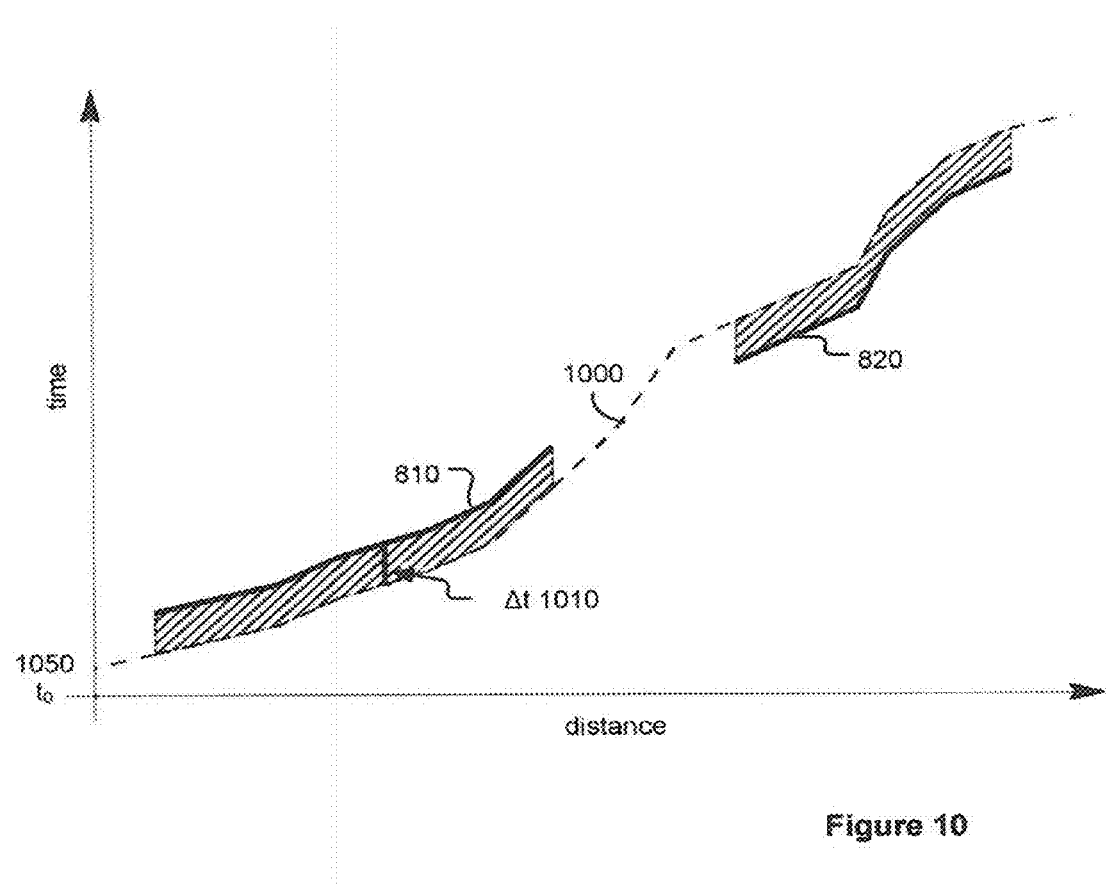
FIG. 10 illustrates fitting virtual journey data to mobile device journey data according to an embodiment of the invention.

It will be recalled from the description above associated with FIG. 9 that even when one or more journey traces are extrapolated, a time difference $\Delta t$ 950 may exist between the traces. Thus the extrapolated journey traces do not necessarily fit temporally together to form the virtual journey i.e. temporal gaps may exist between one or more of the journey traces 810,820 and the virtual journey 1000, as shown in FIG. 10. In embodiments of the invention, a start time of the virtual journey data is determined which minimises an error between the virtual journey data 1000 and the journey data 810, 820 from the mobile device(s). The error is a temporal error between the virtual journey data 1000 and the mobile device journey data 810, 820. A linear regression-like approach is used to determine the start time $t_0$ 1050 of the virtual journey 1000. In embodiments of the invention, a fitting error $E(t_0)$ is determined as in Equation 6 where $\Delta t(t_0, x)$ is a time difference between a mobile device journey trace 810, 820 and the virtual journey 1000 at a distance x, as indicated in FIG. 10 with reference 1010 and l denotes the length of a road segment:

$$E(t_0) = \int \{\text{virtualjourney}\} \Delta t(t_0, x)^2 dx = \Sigma \{\text{roadsegments}\} \Delta t(t_0)^2 \times l \qquad \text{Eqn. 6}$$

The left-hand side of Equation 6 presents the theoretical calculation of the error, whilst the right-hand side presents a more practical implementation where the error may be determined by summing errors for each road segment of the route.

Since $\Delta t(t_0)$ is linear in $t_0$ it follows that $E(t_0)$ is quadratic and so a unique minimum exists which may be found. A value of $t_0$ is determined such that $E(t_0)$ is a minimum using techniques that will be appreciated by those skilled in the art.

In step 740 one or more attributes of the virtual journey are determined. As discussed above, the journey start time $t_0$ indicates the start time of the virtual journey along the route.

Once the start time $t_0$ 1050 for the virtual journey 1000 has been has been determined, the time at the destination of the route may be determined from the virtual journey data 1000 by determining the time at the destination distance on the x (distance) axis. With knowledge of the start and destination times from the virtual journey data 1000, the journey time may be determined.

Figure 11:
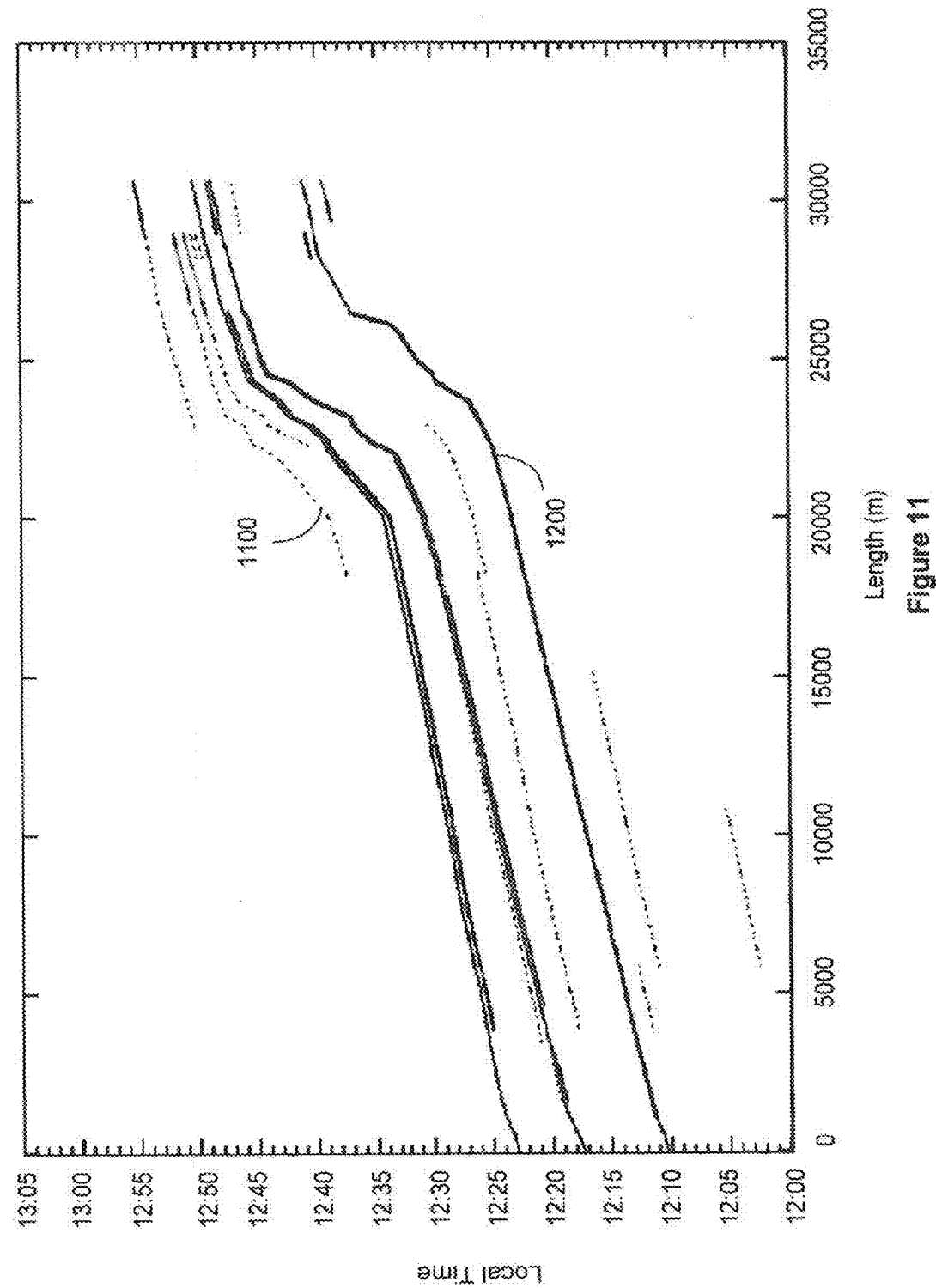
FIG. 11 shows journey data and virtual journey data for a route according to an embodiment of the invention.

FIG. 11 illustrates the output of embodiments of the present invention. A plurality of mobile device journey data is shown indicated in FIG. 11 with dashed lines, generally as 1100 although not all journey data is given a reference numeral for clarity. Determined virtual journey data is shown indicated as 1200. As can be appreciated, the raw mobile device journey data 1100 does not span, in one trace, the entire route. In contrast, the determined virtual journey data 1200 provides a continuous trace between start and destination locations from which the journey time may be estimated.

Embodiments of the invention may also determine one or more quality indicators for the virtual journey. The quality indicators indicate a reliability of the virtual journey. The quality indicators may include one or more of: coverage (either percentage, time or distance) indicating an amount of the virtual journey 1200 formed by journey traces 1100 obtained from mobile devices; the number of mobile device journey traces 1100 used to form the virtual journey either in the form of the number of users (a plurality of journey traces on which the virtual journey is based may derive from the same mobile device user) or the number of journey traces regardless of user; fitting error, where the fitting error indicates how well the journey traces derived from users fit the virtual journey trace.

Embodiments of the present invention and virtual journeys obtained there-from may be used in a variety of situations. In some embodiments, a JTEM 410 executed by a mobile navigation device or a computer, such as a user's computer, may determine a virtual journey from journey data indicative of a plurality of journeys in order to estimate a journey for a determined route. The estimated journey time may be provided to the user to select from amongst a plurality of routes or to provide an indication of journey time remaining during navigation guidance. The mobile navigation device or user computer may have a locally accessible store of journey data, for example the user's own journey data, or may have access to a store of journey data obtained from a plurality of users of mobile devices, such as on server 302.

In other embodiments, a computing device may determine one or more virtual journeys from which estimations of journey time may be obtained. Data indicative of the virtual journeys may be provided to, for example, organisations such as government departments, emergency services etc. For example, a government department may use an estimate of journey time obtained from a virtual journey to display or verify estimated journey time information on variable message signs frequently located proximal to major roads. However, the usefulness of embodiments of the invention is not limited by the above example use.

Advantageously, journey attributes obtained from a virtual journey may be more accurately estimated since a virtual journey may be determined between specific locations of interest, such as start and destination locations, but also intermediate locations. Furthermore, the virtual journey is specific to a particular start time, rather than being an estimate obtained from an average of journeys made within a particular time period. Still further, a plurality of virtual journeys may be determined based at least in part of different journey data thereby further improving journey attribute estimation. Moreover, the journey data on which the virtual journey is based is obtained from real-world users, rather than vehicles travelling a route specifically for the purpose of journey time estimation, which may bias such estimates and is also more environmentally friendly.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A processing device implemented method of estimating one or more attributes of a virtual journey along a route between a start location and a destination location, wherein the virtual journey is a journey that has not been made by a mobile device, but which is constructed from journey data indicative of a plurality of journeys which have been made by one or more mobile devices, comprising:

selecting, by the processing device, a plurality of mobile device journey data, each said mobile device journey data comprising data indicative of the location of the mobile device that was obtained from the mobile device at a plurality of times as the mobile device traveled along a route, wherein at least a portion of the route corresponds to a portion of the route between the start location and the destination location of the virtual journey, and wherein at least one distal or temporal separation exists in the plurality of mobile device journey data, each distal separation being a gap in location between two corresponding sequential mobile device journey data where neither of the corresponding sequential mobile device journey data includes journey data, and each temporal separation being a separation in time between two corresponding sequential mobile device journey data for which neither of the corresponding sequential mobile device journey data includes journey data;

determining, by the processing device, virtual journey data by concatenating the selected plurality of mobile device journey data, said concatenating comprising extrapolating said selected plurality of mobile device journey data for the at least one distal or temporal separation, the extrapolating comprising forming a substantially continuous virtual journey by generating estimated journey data for the at least one distal or temporal separation; and determining, by the processing device, one or more attributes of the virtual journey data.

2. The method of claim 1, wherein the distal separation between the end-points is a distance along one or more road segments forming a route between end points of adjacent mobile device journey data.

3. The method of claim 1, wherein the temporal separation between the end-points is a time between end points of adjacent mobile device journey data.

4. The method of claim 1, wherein the selected plurality of mobile device journey data comprises at least first and second mobile device journey data, and wherein extrapolating said selected plurality of mobile device journey data comprises:

extrapolating from a first geographic location of an end-point of the first mobile device journey data to a second geographic location of an end-point of the second mobile device journey data.

5. The method of claim 4, wherein the mobile device journey data is extrapolated based on a difference between a speed of travel of the mobile device and speed information associated with map data or a free-flow speed of one or more road segments.

6. The method of claim 3, wherein the mobile device journey data is extrapolated based on a difference between a speed of travel of the mobile device and speed information associated with map data or a free-flow speed of one or more road segments, and wherein the temporal separation is a temporal difference between the extrapolated mobile device journey data and the end-point of the adjacent mobile device journey data.

7. The method of claim 1, comprising determining a start time of the virtual journey data based on the plurality of mobile device journey data.

8. The method of claim 7, wherein the start time is determined based on an error value indicative of a temporal error between the virtual journey data and the mobile device journey data.

9. The method of claim 1, wherein the one or more attributes of the virtual journey include a journey time between one or more locations.

10. A computing device for estimating one or more attributes of a virtual journey along a route between a start location and a destination location, wherein the virtual journey is a journey that has not been made by a mobile device, but which is constructed from journey data indicative of a plurality of journeys which have been made by one or more mobile devices, comprising:

a processing device arranged to: select a plurality of mobile device journey data, each said mobile device journey data comprising data indicative of the location of the mobile device that was obtained from the mobile device at a plurality of times as the mobile device traveled along a route, wherein at least a portion of the route corresponds to a portion of the route between the start location and the destination location of the virtual journey, and wherein at least one distal or temporal separation exists in the plurality of mobile device journey data, each distal separation being a gap in location between two corresponding sequential mobile device journey data where neither of the corresponding sequential mobile device journey data includes journey data and each temporal separation being a separation in time between two corresponding sequential mobile device journey data for which neither of the corresponding sequential mobile device journey data includes journey data;

determine virtual journey data by concatenating the selected plurality of mobile device journey data, said concatenating comprising extrapolating said selected plurality of mobile device journey data for the at least one distal or temporal separation, the extrapolating comprising forming a substantially continuous virtual journey by generating estimated journey data for the at least one distal or temporal separation;

determine one or more attributes of the virtual journey data; and a data store accessible to the processing device comprising the mobile device journey data.

11. A non-transitory data storage medium having computer software stored thereon, said computer software operable, when executed by a processing device, to cause the processing device to perform the method of claim 1.

12. The method of claim 1 further comprising providing an indication of a remaining journey time during navigation guidance along the route.

13. The method of claim 1 further comprising determining a plurality of quality indicators for the virtual journey.

14. The method of claim 13, wherein the quality indicators include one or more of: coverage indicating an amount of the virtual journey formed by journey traces obtained from mobile devices; the number of mobile device journey traces used to form the virtual journey either in the form of a plurality of journey traces on which the virtual journey is based derived from a same mobile device user or the number of journey traces regardless of user, and fitting error.

15. The method of claim 1 further comprising using recorded mobile device journey data for a plurality of journeys made by one or more mobile devices and stored in a data store, wherein said mobile device journey data for a journey comprises: a location of the mobile device making the journey at a plurality of times during the journey so as to be representative of the route taken by the mobile device and temporal information indicating a time at which the mobile device followed the route, and wherein said virtual journey is a journey that has not been made by the one or more mobile devices.

* * * * *